United States Patent
Bret et al.

[15] 3,662,282
[45] May 9, 1972

[54] STIMULATED EMISSION SOURCE OF LIGHT

[72] Inventors: Georges Bret; Francois Gires, both of Paris, France

[73] Assignee: CSF-Compagnie General De Telegraphie Sans Fil

[22] Filed: July 24, 1970

[21] Appl. No.: 58,159

Related U.S. Application Data

[63] Continuation of Ser. No. 441,094, Mar. 19, 1965.

[30] Foreign Application Priority Data

Mar. 20, 1964 France....................................968037

[52] U.S. Cl.................................................331/94.5, 350/160
[51] Int. Cl..............................................................H01s 3/11
[58] Field of Search.................331/94.5; 350/147, 150, 160

[56] References Cited

UNITED STATES PATENTS

| 3,289,099 | 11/1966 | Masters | 331/94.5 |
| 3,270,291 | 8/1966 | Kosonocky | 331/94.5 |
| 3,183,359 | 5/1965 | White | 350/160 |

*Primary Examiner*—William L. Sikes
*Attorney*—Cushman, Darby & Cushman

[57] ABSTRACT

A stimulated emission source of light comprises an active body located between two mirrors, at least one of them being only partly reflecting and a pumping source. A plate of a material having a transmission ratio increasing with the intensity of the light incident thereon is placed between the active body and one of the mirrors.

2 Claims, 8 Drawing Figures

STIMULATED EMISSION SOURCE OF LIGHT

This is a continuation of Ser. No. 441,094 filed Mar. 19, 1965.

The present invention relates to stimulated emission sources of light known as lasers.

In devices of this type an active material, which may be a solid or a gas, containing fluorescent ions or atoms, is placed in a cavity with reflecting walls, for example of the Perot and Fabry interferometer type, at least one of these walls being partly transparent.

This material is subjected to the action of a light of an appropriate wavelength, known as an "optical pump." It is found that under the action of this light, under certain conditions which will be defined later, a phenomenon of stimulated emission of light, concentrated in a predetermined direction, takes place.

It is known that it is possible, by means of sources of this kind, to obtain a predetermined instants short and powerful emissions by altering the reflecting power of a wall of the optical cavity. There are two kinds of arrangements of this type : those based on the use of movable mirrors which are in reflecting position only for a very short time, and those based on the use of "optical shutters." Such shutters are used for making the mirror operative for very short time intervals.

For example, Kerr cells can be used to this end.

Such arrangement are costly. They necessitate the use of complicated mechanical parts, or, in the case of Kerr cells, are associated to electronic circuits which are also costly.

It is an object of this invention to provide a pulsed laser, having a much simpler structure.

According to the invention there is provided a stimulated emission source of light comprising an active body located in a cavity with opposite reflecting walls, one of said walls being partly transparent, and submitted to the action of a pump, another body, whose transparency increases with the intensity of the light incident thereon, being placed between said active body and one of said reflecting walls.

For a better understanding of the invention and to show how the same may be carried into effect reference will be made to the drawing accompanying the following description and wherein :

FIG. 1 shows diagrammatically the electron energy levels of the ion $Cr^{3+}$ contained in ruby.

The red fluorescence of this material is due to the transition of ions $Cr^{3+}$ between energy levels 2E and the lowest level $4A_2$.

This fluorescence is caused by a blue or green light, provided by an optical pump, which raises the ions from level $4A_2$ to the higher levels $4F_1$ and $4F_2$.

The transition from level $4A_2$ to levels $4F_1$ and $4F_2$ corresponds to the absorption of blue (B) or green (V) light.

These ions then drop back to the intermediate level 2E, producing phonons in each case.

The lifetime at level 2E is of the order of 5 milliseconds at 300 · K. The $Cr^{3+}$ ions then drop back to level $4A_2$ while emitting red light radiation.

Figure 2:
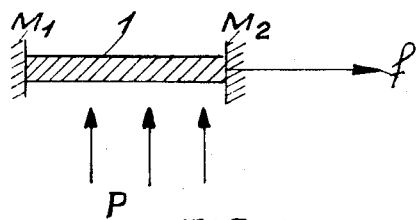
FIG. 2 is a diagrammatic representation of a known laser using a solid active material.

FIG. 2 shows a stimulated emission source based on this principle. The emitting material may, for example, take the form of an elongated body 1. It is placed in a cavity with two reflecting, plane and parallel walls, $M_1$ and $M_2$, at least one of which is partially transparent. The pumping light is concentrated in the direction P parallel to the plane sides. Stimulated emission arises when the population of level 2E produced by optical pumping reaches a critical threshold $n_o$. The emission of light is then concentrated in a direction $f$ normal to the plane sides.

When the threshold is reached one may write the relation :

$$G^2 R_1 R_2 = 1, \quad (1)$$

where $G$ is the amplification factor of the pumped medium, and $R_1$ and $R_2$, are respectively the respective reflecting powers of the two mirror walls $M_1$ and $M_2$.

For a cavity of given cross-section and of given length, one has :

$$n_c - n_o/2 = K \log 1/R_1 R_2 + L, \quad (2)$$

where $K$ and $L$ are constants; $n_o$ is the population in the fundamental state.

Formulae (1) and (2) show that stimulated emission will arise for a population threshold $n_c$ which is all the higher as $R_1 R_2$ is smaller.

Figure 3:
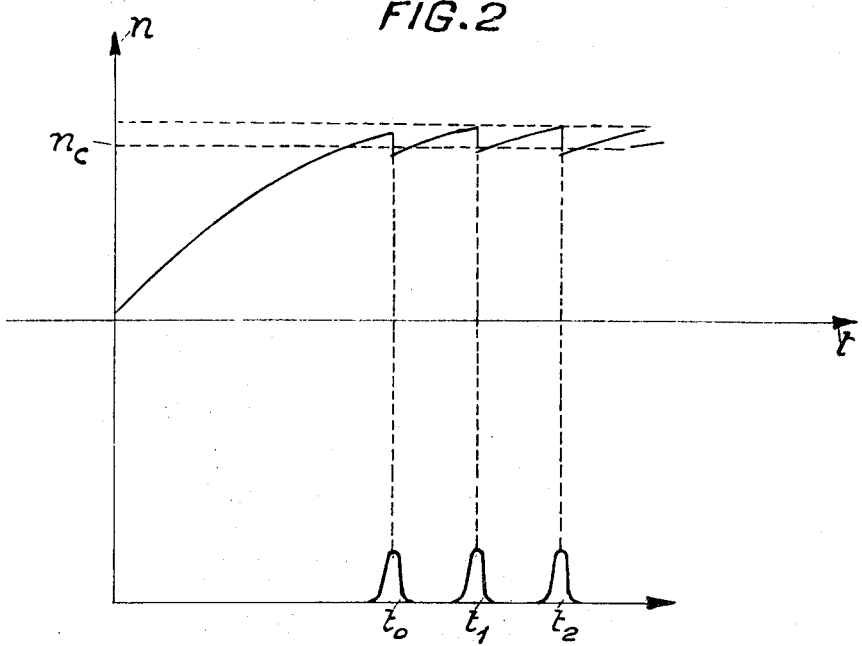
FIG. 3 is an explanatory curve.

In the presence of a continuous source of the blue light, the population $n$ at level 2E develops with time as shown by the curve of FIG. 3.

At time 0 (pumping origin) the population $n$ of level 2E is zero and increases to $n_c$. When $n_c$ is reached, the product $G^2 R_1 R_2$ is greater than one. Stimulated emission arises at time $t_o$ and light is emitted, so that $n$ drops below $n_c$. Product $G^2 R_1 R_2$ becomes less than one and emission stops. Through the action of the pump $n_c$ again increases. The cycle is repeated to the end of the pumping action.

the above description brings out some of the characteristics of known lasers.

In particular, it is impossible to obtain isolated pulses without stopping the pumping action : $n$ does not drop back to the value zero.

Figure 1:
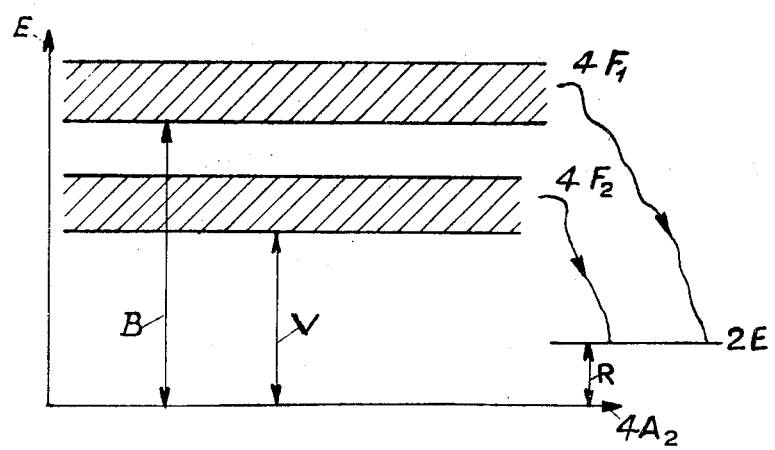
FIG. 1 is a graph showing electron energy levels of ion $Cr^{3+}$.
Figure 4:
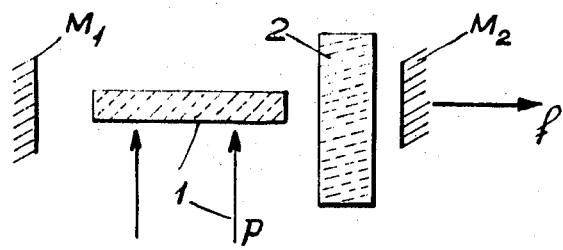
FIG. 4 is a diagrammatic representation of a laser according to the invention.

The arrangement according to the invention, as shown in FIG. 4, differs from that of FIG. 1 in that between material 1 and mirror $M_2$, for example, there is situated a plate or strip 2 of a material whose transparency depends on the intensity of the light passing through it.

When this medium is weakly transparent it absorbs light without reflecting it and so does not act as a mirror.

In other words, $I_t$ being the energy radiated by the strip, and $I_i$ the incident energy, one has :

$$I_t = I_i e^{-\alpha(\lambda) l}$$

where $l$ is the thickness of strip 2, and $\alpha(\lambda)$ is a function of the wavelength, which function is also characteristic of plate 2.

Materials of this kind are known. One of these, a glass containing semiconductive impurities, designated as Schott RG 10 (3 millimeters thick) and commercially obtainable from Jenaer Glaswerk Schott & Gen., Mainz (Germany) is described, as to its properties, by the applicants in the "Comptes Rendus a l'Academie des Sciences" of Mar. 16, 1964. It possesses a transmissing power $I_t/I_i$ equal to 0.002, for low intensities, and increases to 0.5 for the highest available powers ($10^7$W per cm²), i.e. an average electric field of 60 000 volts per cm, in the case of a wavelength of 6,943 A.

Figure 5:
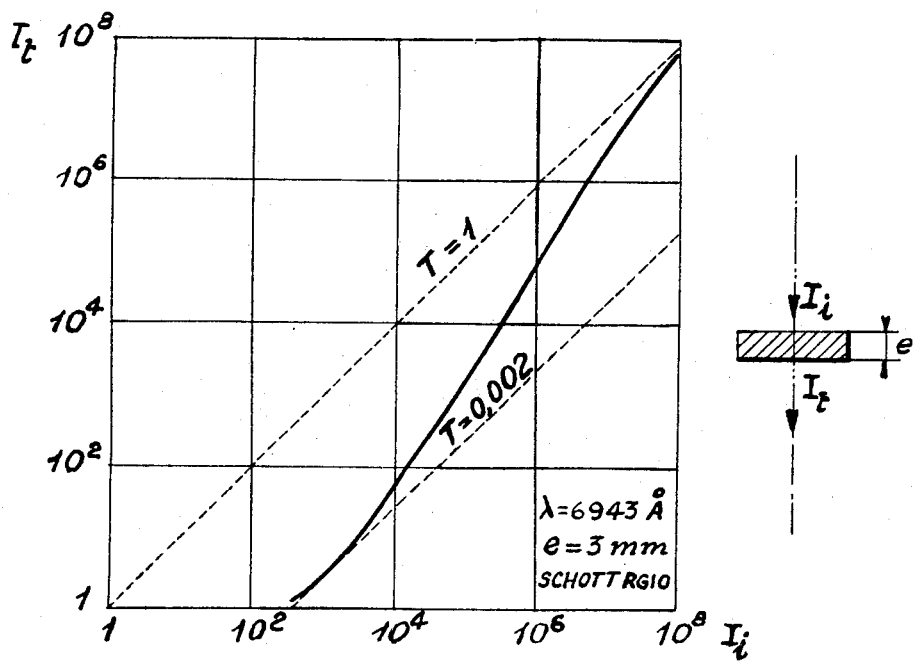
FIGS. 5 and 6 are explanatory curves.

FIG. 5 shows the variations of this transmitting power in logarithmic coordinates.

The operation of an arrangement of this kind will be clear from the following description, with the simplifying assumption, that :

a. the pumping time is long compared to the duration of the emission concerned;

b. the transmitting power of the strip has two values, one, $T_1$, corresponding to low light intensities, and the other, $T_2$, corresponding to high intensities, the strip acting in a discontinuous manner, which of course is in actual fact not correct.

On this basis, FIG. $6_a$ shows against time the variation of the population at level 2E in the arrangement according to the invention.

FIG. $6_b$ shows against time the variations of the critical threshold of the population at level 2E.

FIG. $6_c$ shows against time the intensity of the light emitted by the laser according to the invention.

In view of the above assumption, the combination of plate 2 and mirror $M_2$ may be considered as the equivalent of a mirror having, a low reflecting power before the emission takes place and a high reflecting power, substantially equivalent to that of mirror $M_2$, as soon as emission is initiated. Let $T_1$ be the transmission coefficient of plate 2 for low light intensities and $T_2$ its transmission coefficient for high intensities: $T_1$ is about zero and $T_2$ about one.

a. When there is no stimulated emission of light, the combination plate 2 - mirror $M_2$ acts as a mirror with a low reflection coefficient $R_3 = R_2 T_1^2$. Mirror $M_2$ is masked by plate 2 which, owing to its low transparency, absorbs the luminous energy in its out and in paths, without reflecting it towards mirror $M_1$. As a result the critical threshold $n_{cl}$ is high.

b. As soon as stimulated emission begins to appear, everything happens as though plate 2 had vanished, its transmission coefficient $T_2$ becoming close to one, and only mirror $M_2$ remains. Since this mirror has a substantial reflecting power although being transparent, the critical level is lowered to $n_{o2}$, practically as soon as stimulated emission starts.

Thus curve $6_a$ shows the variations of population at level 2E as a function of time.

At time 0, i.e. at the start of the pumping action, plate 2 is absorptive and the population is zero. Through the pumping action it grows and reaches $n_{cl}$ at time $t_1$, $n_{cl}$ being the critical threshold corresponding to the product $R_1 \times R_3$ which, as has been seen above, is small.

At that instant stimulated emission is initiated; $n$ decreases but, as shown in FIG. $6_b$, through the action of stimulated emission plate 2 becomes transparent.

The critical threshold then depends on the product $R_1 R_2$ and drops to $n_{o2}$ for the duration of emission. The population $n$ suddenly decreases from a value higher than $n_{cl}$ to a value lower than $n_{o2}$ at time $t_2$.

Conditions are then reversed, emission ends, and the critical threshold returns to the value $n_{cl}$ corresponding to product $R_1 R_3$, strip 2 becoming absorbent once more, i.e. it now has a low transmitting power.

Since these phenomena are extremely rapid, if the pump used is an electronic flash discharge tube, a single, short and powerful pulse is obtained.

The matter can also be viewed as follows. At the moment the stimulated emission starts, the critical threshold being high, light begins to appear: the transmitting power of strip 2 then appreciably increases, the light intensity increases in its turn, so further improving the transmitting power.

The luminous energy pulse is produced like an avanlache effect in an electrical discharge. It continues until level 2E is discharged below the critical threshold corresponding to the nontransparency of strip 2.

As compared to known arrangements operated by means of electro-optical shutters, the arrangement described possesses the obvious advantage of simplicity.

However, since the system is a relaxation oscillator system, it is difficult to control with absolute precision the instant when oscillation starts. This may be a source of trouble, for example in the case of optical ranging systems.

Figure 7:
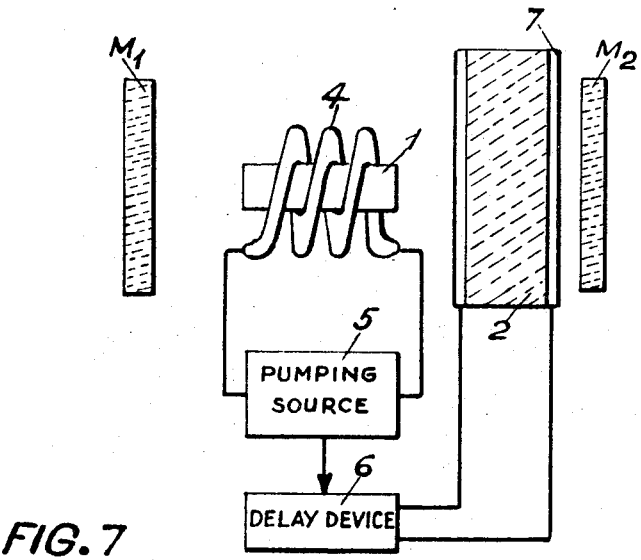
FIG. 7 is a diagrammatic representation of another embodiment of a laser according to the invention.
Figures 6, 8:
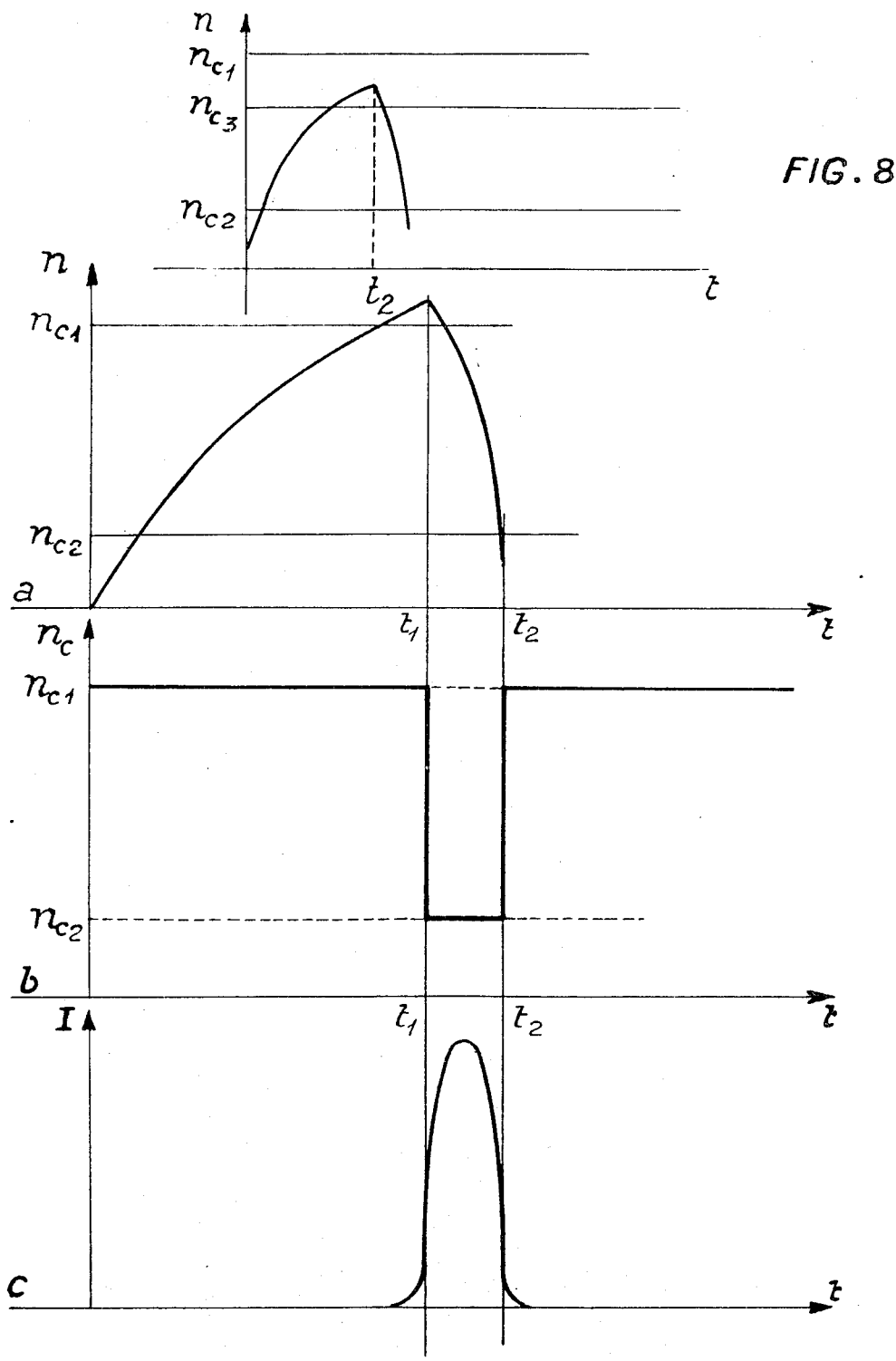
FIG. 8 is an explanatory curve.

The arrangement of FIG. 7 is free of such a drawback.

In some materials with a variable transmitting power, such as the glass mentioned above, the transmitting power increases or decreases when an electric field is applied in a direction parallel or at right angles to the transmitted light.

FIG. 7 shows a laser in which this property has been used. It comprises the active material 1, plate 2 and the two mirrors $M_1$ and $M_2$; the pumping light is supplied by a flashlamp 4 fed with pulses by a source 5.

Source 5 controls, through a delay device 6, the application of an electric field on the two sides of plate 2. For this purpose plate 2, is, for example, placed in a container 7 filled with a conducting liquid, the liquid and container assembly being transparent.

It will be assumed that the application of this field increases the transparency T of plate 2.

As a result, if the flashlamp is started at time $t_0$, the population $n$ at level 2E will increase up to time $t_1$ and will reach, for example, a value less than $n_{cl}$, the critical level corresponding to the reflecting power of the system assembly built up by plate 2 and mirror $M_2$ for low intensities of light, i.e.
$$R_3 = R_2 T_1^2.$$

Application at time $t_1$ of the electric field $\epsilon$ will increase the transmitting power of strip 2. The assembly plate 2 - mirror $M_2$ will have the reflecting power $R_4 = R_2 T_3^2$ with $T_3^2$ greater than $T_1^2$.

The critical level will be lowered from $n_{cl}$ to $n_{c3}$ higher than $n_{c2}$.

At that instant n is higher than $n_{c3}$ and emission is initiated at imposed time $t_2$.

In the case when the transmitting power is lowered by application of an electric field, the same result will be obtained by suppressing the application of the field at time $t_2$.

On the whole the action of the arrangement described is akin to that of a blocking oscillator.

If no special precautions are taken, the light pulse trains are initiated at random times.

These times can be made fixed by applying synchronizing pulses.

It is to be understood that the invention is not restricted to the embodiments described which were given solely by way of examples.

What is claimed is:

1. A stimulated emission light source comprising in combination:
    a cavity;
    an active body having two ends and positioned in said cavity for emitting light by stimulated emission;
    one reflecting wall portion and one partly reflecting wall portion associated with said cavity and positioned respectively opposite said ends;
    pumping means associated with said body;
    a plate of semi-conducting material positioned between one of said ends and one of said wall portions and having a transmission ratio increasing in a continuous way with the intensity of the incident light emitted by said active body and as a function of an applied electric field,
    said plate having two control electrodes; and
    synchronizing means feeding said electrodes of said plate.

2. A stimulated emission light source comprising in combination:
    a cavity;
    a chromium doped ruby rod having two ends and positioned in said cavity for emitting light by stimulated emission;
    one reflecting wall portion and one partly reflecting wall portion associated with said cavity and positioned respectively opposite said ends;
    pumping means associated with said rod;
    a plate positioned between one of said ends and one of said wall portions and having a transmission ratio increasing in a continuous way with the intensity of the incident light emitted by said rod and as a function of an applied electric field,
    said plate being cut in a glass sample containing semi-conductive impurities and having two control electrodes; and
    synchronizing means feeding said electrodes of said plate.

* * * * *